Oct. 7, 1969 D. A. NEWMAN 3,471,360
TRANSFER ELEMENTS AND PROCESS FOR PREPARING THE SAME
Filed Feb. 14, 1967

INVENTOR.
Douglas A. Newman
BY
Johnson and Kline
ATTORNEYS

United States Patent Office 3,471,360
Patented Oct. 7, 1969

3,471,360
TRANSFER ELEMENTS AND PROCESS FOR PREPARING THE SAME

Douglas A. Newman, Glen Cove, N.Y., assignor to Columbia Ribbon and Carbon Manufacturing Co., Inc., Glen Cove, N.Y., a corporation of New York
Filed Feb. 14, 1967, Ser. No. 616,057
Int. Cl. B32b 27/06, 27/08
U.S. Cl. 161—227                             10 Claims

ABSTRACT OF THE DISCLOSURE

The process of producing novel pressure-sensitive ink-releasing sheets and ribbons including the steps of casting a self-supporting foundation film of plastic composition and, prior to the drying thereof, casting thereover an ink-releasing layer as a solution of plastic binder material and incompatible ink, and drying the composite article to cause the ink layer and foundation to solidify and bond together.

---

The present invention relates to transfer sheets and ribbons of the so-called "squeeze-out" type as opposed to those of the frangible type in which the imaging layer is pressure-transferable in mass. Squeeze-out type transfer elements function, as the name implies, by exuding an amount of flowable ink from a spongy, porous, resinous binder material under the effects of imaging pressure. The following United States patents are illustrative of such sheets and ribbons: Nos. 2,944,037; 3,037,879; and 3,117,018. One of the problems encountered with such products is caused by the relatively large amount of fluid oleous ink present and the porous nature of the ink layer. When such ink layers are applied directly to a paper foundation, the oleous ink is absorbed by the paper and the transfer element loses its imaging strength rapidly.

This problem has been overcome in the field by applying an intermediate plastic sealant coating between the paper and the ink layer or by using a plastic film foundation in place of paper. The former solution has proven unsatisfactory because of the high curling tendency of plastic coated paper. The latter solution also presents new problems because of the difficulty of handling and coating thin plastic film due to static electricity and because of the difficulty of bonding the ink layer to a smooth plastic film.

It is the main objective of the present invention to provide a method for producing squeeze-out transfer elements which overcomes all of these deficiencies and disadvantages.

It is another object of this invention to produce transfer elements which do not lose their imaging strength except through use and which have their ink-releasing layer intimately bonded to their foundation.

Figure 1:
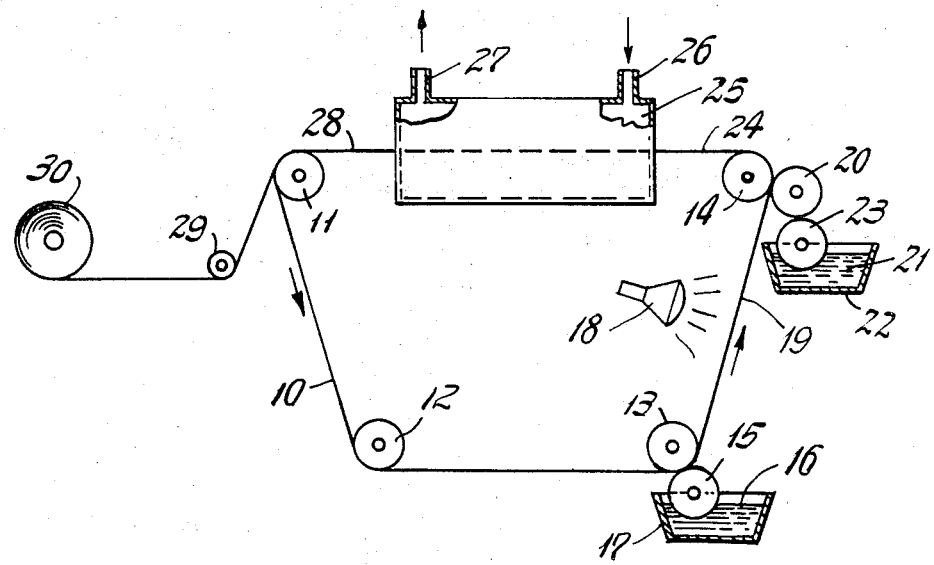
Figure 2:
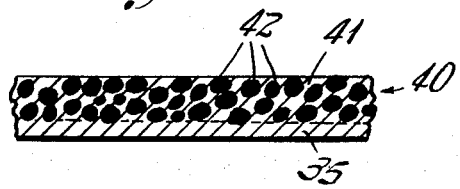

These and other objects and advantages of the present invention will be clear to those skilled in the art in the light of the following disclosure including the drawings, in which:

FIGURE 1 is a plan view illustrating one type of apparatus useful for carrying out the present process, and FIG. 2 is a diagrammatic cross-section, to an enlarged scale, of the novel transfer elements prepared according to this invention.

The present invention is based upon the discovery that transfer elements can be produced by casting the film foundation during the production of the transfer elements and applying the ink layer to the cast foundation before the foundation is solidified and then solidifying the ink layer and the foundation simultaneously to cause the ink layer to become intimately bonded or integrated with the surface of the foundation so that peeling or separation is completely overcome.

One of the critical limitations of this invention is that the solvent used to apply the ink layer must not be a solvent for the plastic or resinous foundation. Otherwise the foundation becomes unduly weakened since it is not oriented or prestressed to give it strength as is the case with preformed films. Thus the resinous material of the foundation must be different than the resinous binder material of the ink layer. In any event, this is preferable since resinous materials which have the strength and toughness required for the foundation generally do not have the softness and compressibility required for the binder material of the ink layer.

Preferred resinous materials for the foundation are polyvinyl chloride, polyethylene, nylon, acrylic resins such as polymethyl methacrylate, styrene-methyl methacrylate copolymers, cellulose acetate, and the like.

The ink layer composition may be any of the conventional compositions currently used in the art, such as those disclosed in the U.S. patents mentioned hereinbefore. The preferred binders are vinyl resins such as vinyl chloride-vinyl acetate copolymer, acrylic resins such as methyl methacrylate-ethyl acrylate copolymer, mixtures of acrylics and vinyls, and polycarbonate resins.

Referring to the drawings, FIG. 1 illustrates one form of apparatus which can be used to carry out the present process and form the transfer elements of the present invention. The apparatus comprises basically a continuous casting surface or belt 10 which is supported on rollers 11, 12, 13 and 14. Adjacent to roller 13 the belt contacts an application roller 15 which applies a continuous layer of plastic solution 16 to the belt from vat 17. The plastic-coated belt then passes heat source 18 which evaporates the major amount of solvent from the layer of plastic solution to form self-supporting plastic layer 19 without completely drying the layer. In this condition the plastic layer on the belt contacts application roller 20 adjacent to belt roller 14. Roller 20 is provided with a continuous supply of resinous ink solution 21 from vat 22 by means of immersed roller 23.

A continuous layer of ink solution 24 is thereby applied over the incompletely dried plastic layer 19. Next in its continuous travel, the coated casting belt passes through a heating tunnel 25 into which hot air is introduced through duct 26 and from which air and volatilized solvent is evacuated through duct 27. On leaving the heating tunnel the plastic layer and the ink layer are substantially completely free of volatile solvent and have integrated together at the interface as transfer element 28 so that separation of the two is impossible. Next the transfer element 28 is parted from the casting belt 10 and passes under roller 29 onto take-up roll 30.

The final transfer element 28 has the structure illustrated by FIG. 2 which shows the solidified plastic layer 35 and the solidified ink layer 40 consisting of a resinous sponge structure 41 having dispersed therein pressure exudable ink droplets 42.

The following example is given by way of illustration and should not be considered limitative.

EXAMPLE 1

The following plastic solution is formulated and added to vat 17 of the apparatus of FIG. 1 to provide the plastic layer 35 of the present transfer elements:

| Ingredients: | Parts by wt. |
| --- | --- |
| Nylon | 10.0 |
| Pigment (if desired) | 0.5 |
| Ethyl alcohol | 70.0 |

The following resinous ink solution is formulated and added to vat 22 of the apparatus of FIG. 1 to provide the ink layer 40 of the present transfer elements:

Ingredients: Parts by wt.
- Vinyl chloride-vinyl acetate copolymer  10.0
- Mineral oil (ink vehicle)  25.0
- Toned carbon black  6.0
- Flushed alkali blue  2.0
- Toluene  15.0
- Ethyl acetate  45.0

The casting belt 10 is a continuous thin film of tetrafluoroethylene, commercially available under the registered trademark Teflon. The belt is rotated counterclockwise and picks up a thin layer of the nylon solution from roller 15. A doctor blade is preferably used in association with roller 15 so that the applied layer has a thickness of about 20 mils or 0.02 inch. Then the coated belt passes a heat source such as infrared radiation lamp 18 which heats the coating below about 100° F. in the area of about 90° F. to evaporate the major amount of the ethyl alcohol and render the nylon layer self-supporting although its tackiness is retained due to residual solvent. At this point the thickness of the nylon layer is about 5 mils or 0.005 inch.

In this condition the nylon layer contacts the ink application roller 20 which supplies a continuous layer of resinous ink solution from vat 22. A doctor blade is also preferably used at this point to control the thickness of the ink solution coating to about 5 mils or 0.005 inch. Next the ink-coated belt passes into heating tunnel 25 where it is contacted with forced hot air at a temperature of between about 150° F. and 200° F., preferably about 180° F. This causes evaporation of the solvents from the ink layer and evaporation of the residual solvent for the plastic layer. The ink layer and the nylon layer fuse together as a unitary transfer element and cannot be thereafter separated.

Finally the transfer element is parted from the casting belt after exit from the heating tunnel and is wound on take-up roll 30.

The final ink layer 40 has a thickness of about 1.5 mils and comprises the vinyl chloride-vinyl acetate copolymer as the non-transferable porous structure 41 which contains the mineral oil and pigments as dispersed ink droplets 42. The mineral oil is incompatible with the vinyl resin and therefore separates therefrom as the ink vehicle.

In place of the nylon solution of the example, it is possible to use any other film-forming resinous material provided that the resin is not soluble in the volatile solvent used to apply the ink layer. Suitable resinous solutions are polyvinyl chloride dissolved in acetone; polyethylene dissolved in hot toluol; cellulose acetate dissolved in methyl ethyl ketone; polymethyl methacrylate dissolved in acetone; and the like. Most film-forming synthetic resins are commercially available with a suitable plasticizer already incorporated, and the selection of an appropriate volatile solvent is within the skill of the art.

In place of the vinyl chloride-vinyl acetate (Vinylite VYHH) ink solution of the example, other conventional squeeze-out type resinous ink compositions may be used, such as those disclosed in the examples of U.S. Patent Nos. 2,944,037; 3,037,879; and 3,117,018, among others. Suitable compositions comprise 10 parts by weight of a film-forming binder material, from 7.5 to 35 parts by weight of an oleaginous material (such as a liquid oil) which is incompatible with the binder material, and from 3 to 75 parts by weight of coloring matter. It is also useful to include a wetting agent such as lecithin, sorbital esters, or the like.

The essential heating steps of the present process must be controlled along the following lines. In the first heating operation, the degree of heat applied and/or the duration of heating must be such as to cause evaporation of the major amount of the volatile solvent from the plastic layer but insufficient to cause the plastic layer to lose its tackiness. This condition is retained while the plastic layer still contains some of the volatile solvent. The degree of heat is preferably at least ten degrees higher than the evaporation temperature of the solvent in cases where the transfer element is produced on a continuously-moving casting surface, since the duration of heating is relatively short. Temperatures in the area of from 70° C. to 90° C. are generally used.

The self-supporting tacky condition of the plastic layer is essential to the receptivity and retention of the resinous ink layer. Unless the plastic layer is self-supporting, it will not accept the ink from the application roller but rather will tend to transfer to the application roller and/or to collect as a liquid mass at the point where the application roller 20 contacts the casting surface. Similarly, unless the plastic layer is tacky and unhardened, it will not bond well to the applied resinous ink layer and parting may result.

The second essential heating step occurs after application of the ink solution and requires a sufficiently high temperature and/or duration to cause complete evaporation of the volatile solvents from both the ink layer and the supporting plastic layer and to cause the plastic layer to set and lose its tackiness. This latter effect is caused merely by the complete evaporation of volatile solvent, which requires temperatures in the area of 70° C. to 120° C. depending on the volatility of the solvent used and the duration of heating. In a continuously-moving operation as shown in FIG. 1 of the drawing, the degree of heat applied, preferably circulated forced hot air to accomplish removal of the solvent vapors, is preferably at least ten degrees higher than the evaporated temperature of the solvent.

According to the preferred embodiment, the unitary transfer element is oriented or stretched in conventional manner after the second heating step, i.e., after the ink layer and the foundation film have been dried and set. The unitary element may be oriented symmetrically or asymmetrically and this step has been found to affect not only the film foundation but also the resinous ink layer. The oriented transfer element is much stronger and more resistant to cut-through by the type face and produces sharper copy than a corresponding unoriented element. The oriented element also is more reusable since it does not become as baggy or as embossed during use as the unoriented element. Orientation is generally carried out by heating the unitary transfer element above room temperature, physically stretching the element in one or preferably in both directions to increase its dimensions by at least about 10% and then applying additional heat for a brief period to allow the resin molecules to redistribute themselves in the oriented foundation and ink layer.

In place of the Teflon casting belt, it is possible to use other conventional casting surfaces such as glass, stainless steel and other inert plastic films such as polyethylene terephthalate polyester (Mylar). It is also preferred to apply a conventional release agent to the casting surface prior to applying the initial plastic layer. Silicone oil coatings may be used for this purpose.

Variations and modifications may be made within the scope of the claims and portions of the improvements may be used without others.

I claim:
1. Process of producing a pressure-sensitive ink-releasing transfer element comprising the steps of:
   (a) preparing a solution of a synthetic thermoplastic film-forming binder material in a volatile organic solvent,
   (b) applying the solution to a casting surface in the form of a thin film and partially evaporating the solvent to produce a self-supporting film foundation having a soft tacky surface,
   (c) applying over said tacky surface a layer of resinous ink composition comprising 10 parts by weight of a synthetic thermoplastic film-forming binder material, from 7.5 to 35 parts by weight of an oily ink vehicle which is incompatible with said binder material, from 3 to 75 parts by weight of coloring matter and a volatile organic solvent which is a non-solvent for said film foundation, (d) heating said combination to evaporate the volatile solvent from said ink composition to form a porous ink layer and the residual volatile solvent from said film foundation to cause said ink layer and said film foundation to solidify together as an integrated unitary body, and (e) removing said body from said casting surface as a pressure-sensitive ink-releasing transfer element.

2. The process according to claim 1 in which the partial evaporation of the solvent from the film foundation is caused by heating the film to a temperature below about 100° F.

3. The process according to claim 1 in which the heating in step (d) is conducted at a temperature between about 150° F. and 200° F.

4. The process according to claim 1 in which the film-forming material of the foundation is nylon.

5. The process according to claim 1 in which the film-forming material of the ink layer is a vinyl resin.

6. The process according to claim 1 in which the final pressure-sensitive ink-releasing transfer element is stretched in at least one direction to increase its strength.

7. A pressure-sensitive ink-releasing transfer element produced according to the process of claim 1.

8. A pressure-sensitive ink-releasing transfer element according to claim 7 and which is stretched in at least one direction to increase its strength.

9. A pressure-sensitive ink-releasing transfer element according to claim 7 in which the film-forming material of the foundation is nylon.

10. A pressure-senstive ink-releasing transfer element according to claim 7 in which the film-forming material of the ink layer is a vinyl resin.

References Cited

UNITED STATES PATENTS

| | | | |
|---|---|---|---|
| 1,514,283 | 11/1924 | Haste | 264—171 |
| 2,779,684 | 1/1957 | Alles | 264—289 |
| 2,952,043 | 9/1960 | Uraneck et al. | 264—171 |
| 2,968,065 | 1/1961 | Gronholz | 264—289 |
| 3,037,879 | 5/1962 | Newman et al. | 117—36.1 |
| 3,392,042 | 7/1968 | Findlay et al. | 117—36.1 |

FOREIGN PATENTS 989,622  4/1965  Great Britain.

MURRAY KATZ, Primary Examiner

U.S. Cl. X.R.

117—36.1, 138.8; 161—252; 264—171, 212, 289